United States Patent
Lou et al.

(10) Patent No.: US 9,535,294 B2
(45) Date of Patent: Jan. 3, 2017

(54) DISPLAY DEVICE AND METHOD FOR MANUFACTURING THE SAME

(71) Applicants: Shanghai Tianma Micro-Electronics Co., Ltd., Shanghai (CN); Tianma Micro-Electronics Co., Ltd., Shenzhen (CN)

(72) Inventors: Junhui Lou, Shanghai (CN); Yong Wu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 13 days.

(21) Appl. No.: 14/743,939

(22) Filed: Jun. 18, 2015

(65) Prior Publication Data
US 2016/0187686 A1   Jun. 30, 2016

(30) Foreign Application Priority Data
Dec. 25, 2014  (CN) .......................... 2014 1 0838361

(51) Int. Cl.
*G02F 1/1339* (2006.01)
*G09G 3/30* (2006.01)
*G09G 3/36* (2006.01)
*G02F 1/1335* (2006.01)
*G02F 1/1345* (2006.01)

(52) U.S. Cl.
CPC ......... *G02F 1/1339* (2013.01); *G02F 1/13452* (2013.01); *G02F 1/133514* (2013.01)

(58) Field of Classification Search
CPC .... G02F 1/1339; G02F 1/1341; G02F 1/1345; G02F 1/133451; G02F 1/1394; G02F 2001/13415; G09G 2300/0842; G09G 3/3233; G09G 2300/0819; G09G 3/3648; G09G 3/3614; G09G 3/3659
USPC .................................................. 349/153, 190
See application file for complete search history.

(56) References Cited

U.S. PATENT DOCUMENTS

| | | | |
|---|---|---|---|
| 9,318,427 B2* | 4/2016 | Youn ................... | H01L 23/4985 |
| 2008/0178453 A1* | 7/2008 | Gnade ................. | D03D 1/0088 29/428 |
| 2016/0026030 A1* | 1/2016 | Kang ................... | H05K 7/1417 349/58 |

FOREIGN PATENT DOCUMENTS

KR   1020110068169 A   6/2011

* cited by examiner

*Primary Examiner* — Mike Qi
(74) *Attorney, Agent, or Firm* — Alston & Bird LLP

(57) ABSTRACT

A display device is disclosed. The display device includes a first display substrate, an opposite substrate, and a sealing material forming a sealed area including a display area, where the sealing material is disposed between the first display substrate and the opposite substrate. The first display substrate includes a substrate and a flexible thin film, where the flexible thin film includes a first area entirely covering the display area, and a second area beyond the substrate. In addition, a first circuit is disposed on the first area, and a second circuit is disposed on the second area.

22 Claims, 12 Drawing Sheets

DISPLAY DEVICE AND METHOD FOR MANUFACTURING THE SAME

CROSS-REFERENCES TO RELATED APPLICATIONS

This application claims the benefit of priority to Chinese Patent Application No. 201410838361.3, filed with the Chinese Patent Office on Dec. 25, 2014, and entitled "DISPLAY DEVICE AND METHOD FOR MANUFACTURING THE SAME", the content of which is incorporated herein by reference in its entirety.

BACKGROUND OF THE INVENTION

The present disclosure relates to the field of displays and particularly to a display device and a method for manufacturing the same.

Thin Film Transistor-Liquid Crystal Displays (TFT-LCDs) with a high display quality, low power consumption, no radiation and other excellent performances have become predominate in the market along with the development of liquid crystal display technologies. An LCD panel generally includes a color filter substrate, and an array substrate, between which liquid crystals are filled, where the liquid crystals are sealed therearound with sealant. With a wider border, the size of the periphery of the LCD panel is larger, the real display area of the display panel is smaller, and a picture is displayed smaller, so the consumer demand for a thinner liquid crystal display panel, and a wider screen cannot be accommodated.

In an existing narrow border design, even with a reduction in width of the border, it may be very difficult to further narrow the border of the liquid crystal display panel due to limitation by the requisite size of a peripheral circuit. Also the peripheral circuit being shrunk extremely due to the narrowed border may result in a degraded charging effect and a lower yield of the circuits.

BRIEF SUMMARY OF THE INVENTION

One inventive aspect is a display device. The display device includes a first display substrate, an opposite substrate, and a sealing material forming a sealed area including a display area, where the sealing material is disposed between the first display substrate and the opposite substrate. The first display substrate includes a substrate and a flexible thin film, where the flexible thin film includes a first area entirely covering the display area, and a second area beyond the substrate. In addition, a first circuit is disposed on the first area, and a second circuit is disposed on the second area.

Another inventive aspect is a method for manufacturing a display device. The method includes preparing a first substrate, and fabricating a flexible thin film on the first substrate to entirely cover the first substrate, where the flexible thin film includes a first area corresponding to a display area, and a second area, on the first substrate. The method also includes fabricating a first circuit on the first area and a second circuit on the second area, preparing a second substrate, and disposing and aligning a sealing material between the first substrate and the second substrate, where the display area is sealed by the sealing material. The method also includes removing excess parts of the first substrate and the second substrate to obtain a first display substrate and an opposite substrate, where the first display substrate includes a substrate and the flexible thin film, the second area of the flexible thin film extends beyond an area of the substrate, the excess part of the first substrate is the first substrate extending beyond the sealing material, and the excess part of the second substrate is the second substrate extending beyond the sealing material.

BRIEF DESCRIPTION OF THE DRAWINGS

In order to make the technical solutions according to the embodiments of the disclosure more apparent, the drawings to which reference is made in the description of the embodiments will be described below briefly, and apparently the drawings in the following description are merely illustrative some of the embodiments of the disclosure, and those ordinarily skilled in the art can further derive from these drawings other drawings without any inventive effort.

DETAILED DESCRIPTION OF THE INVENTION

In order to make the objects, technical solutions and advantages of the disclosure more apparent, the disclosure will be described below in further details with reference to the drawings, and evidently the embodiments described here are merely a part but not all of the embodiments of the disclosure. Based upon the embodiments according to the disclosure, all the other embodiments which can occur to those ordinarily skilled in the art without any inventive effort shall fall into the claimed scope of the disclosure.

Figure 1:
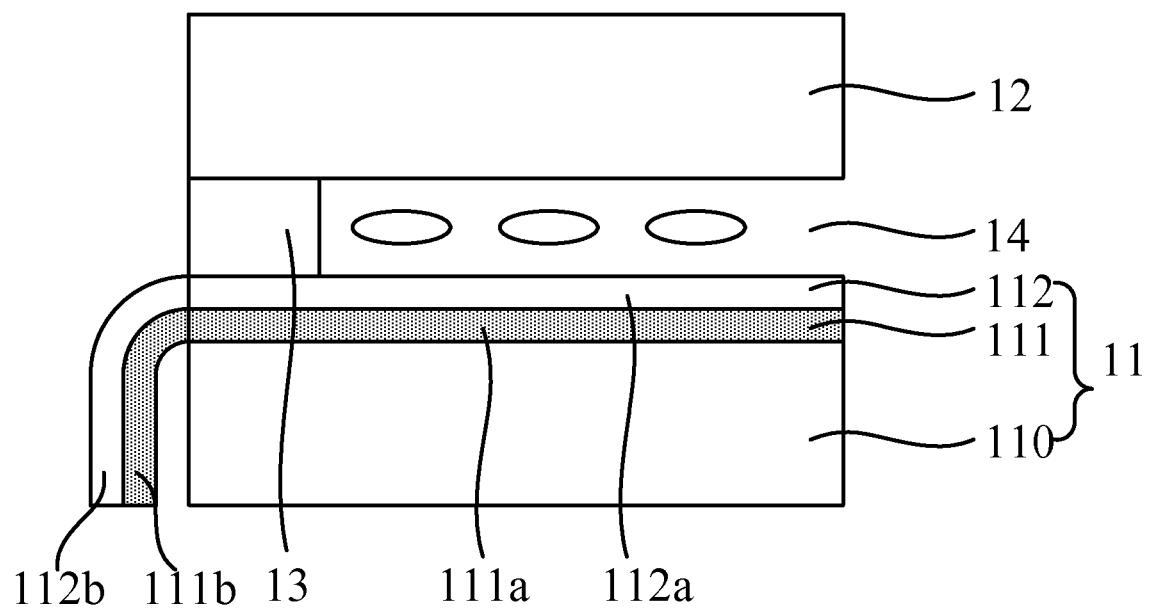
FIG. 1 illustrates a schematic structural diagram of a display device according to an embodiment of the disclosure in a sectional view.

FIG. 1 illustrates a schematic structural diagram of a display device according to an embodiment of the disclosure in a sectional view.

As illustrated in FIG. 1, the display device may include a first display substrate 11, and an opposite substrate 12, between which a sealing material 13 is disposed with a sealed area being a display area, where the first display substrate 11 includes a substrate 110, and a flexible thin film 111 including a first area 111a covering the display area entirely, and a second area 111b beyond the substrate 110;

and a first circuit 112a is disposed on the first area 111a, and a second circuit 112b is disposed on the second area 111b. The first circuit 112a and the second circuit 112b constitute a circuit 112, where the first circuit 112a disposed on the first area 111a is a pixel circuit, and the second circuit 112b disposed on the second area 111b is a peripheral circuit. Particularly the pixel circuit disposed on the first area 111a is an array of pixels. The peripheral circuit disposed on the second area 111b may be an Amorphous Silicon Gate Driver (ASG) circuit or a poly-silicon gate driving circuit or may be an electrode wire circuit or an integrated control circuit.

Moreover it shall be noted that the display device according to this embodiment is a liquid crystal display device, the first display substrate 11 is an array substrate, the opposite substrate 12 is a color filter substrate, and a liquid crystal layer 14 is disposed between the array substrate and the color filter substrate. However in some other embodiments of the disclosure, alternatively the display device may be an organic light-emitting display device, the first display substrate may be an array substrate, and the opposite substrate may be a protection cap substrate or another substrate, but the disclosure will not be limited to this embodiment described here.

Figure 2:
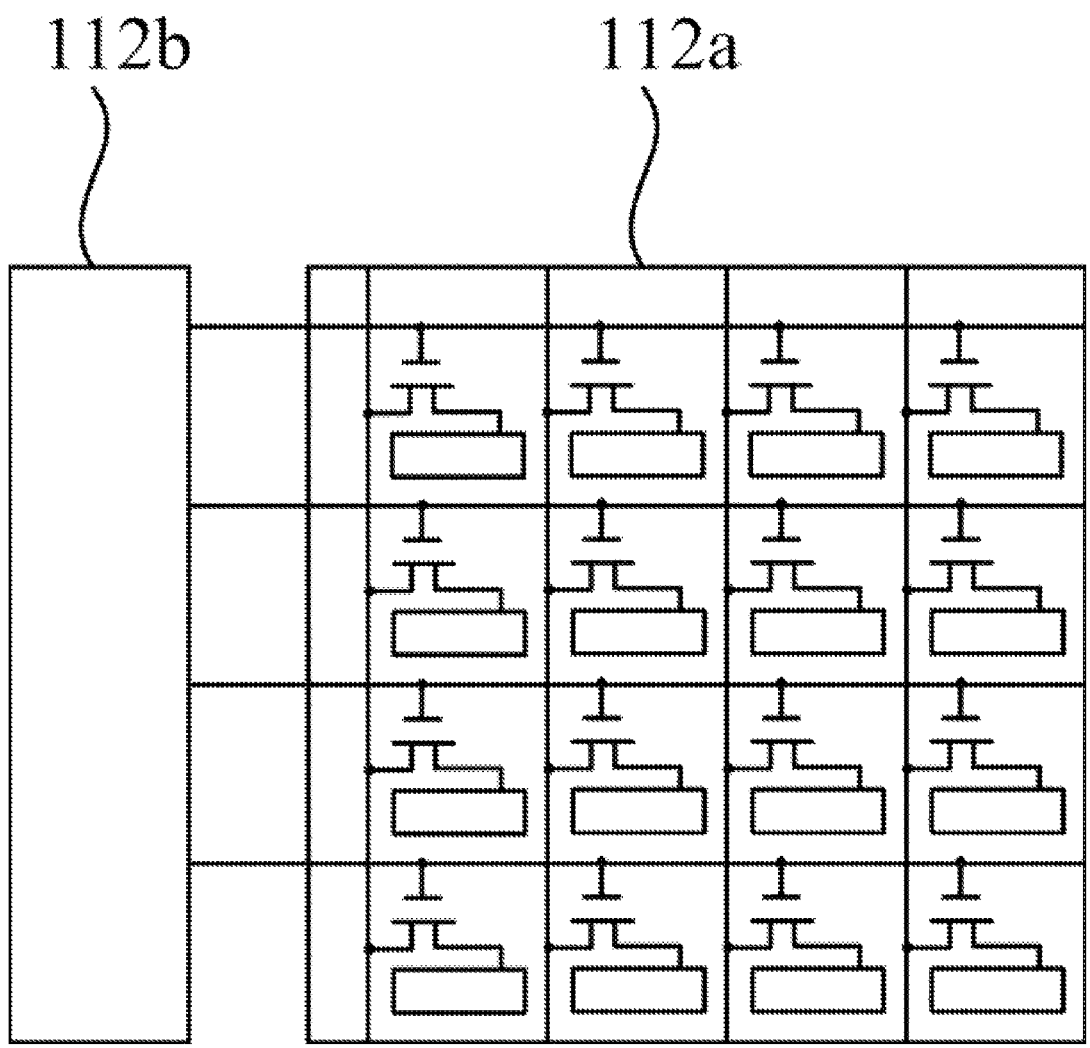
FIG. 2 illustrates a schematic structural diagram of a first area and a second area in the display device according to the embodiment of the disclosure in a top view.

In the liquid crystal display device according to the embodiment above, referring to FIG. 2 which is a schematic structural diagram of the first circuit 112a disposed on the first area 111a as a pixel circuit, and the second circuit 112b disposed on the second area 111b as a peripheral circuit in a top view, FIG. 2 illustrates a schematic structural diagram of the first area 111a and the second area 111b in the display device according to the embodiment of the disclosure in a top view. It shall be noted that FIG. 2 illustrates another state than the state in which the flexible thin film 11 is bent, but the disclosure will not be limited to the state illustrated in FIG. 2 in a real implementation. As illustrated in FIG. 2, 112a refers to a pixel circuit disposed on the first area 111a and 112b refers to a peripheral circuit disposed on the second area 111b in FIG. 1.

Correspondingly an embodiment of the disclosure provides an array substrate including a transparent rigid substrate and a flexible thin film, where the flexible thin film includes a first area covering the display area entirely, and a second area beyond the transparent rigid substrate; and the first area is disposed on the transparent rigid substrate, an array of pixels is disposed on the first area, and a peripheral circuit is disposed on the second area.

In the display device according to this embodiment, the sealing material 13 is in the shape of closed loop, and the substrate 110 is correspondingly in the shape of rectangle. Three edges of the substrate 110 of the first display substrate 11 are aligned with outer edges of the sealing material 13. This structure is adopted due to a step in the substrate 110 of the first display substrate 11, where connection terminals connecting an external circuit with a display device circuit are disposed on the step only on the edge where the step is located, so that the other edges can be aligned with the outer edges of the sealing material 13 to thereby narrow the border of the display device and improve the screen occupation ratio. It shall be noted that in order to cut the array substrate flexibly at a lower labor cost, the edges of the first display substrate 11 may or may not be aligned with the outer edges of the sealing material 13. In some other embodiments of the disclosure, the substrate of the first display substrate may include four edges around the substrate, at least one of which is aligned with the outer edge of the sealing material, and this structure can be adopted to thereby save process steps in the manufacturing process so as to improve the manufacturing efficiency and lower the cost.

Moreover in this embodiment, edges of the opposite substrate 12 are aligned with the outer edges of the sealing material. In this embodiment, the opposite substrate 12 is a color filter substrate on which typically no driving circuits or pixel circuits or other circuits are disposed. The edges of the opposite substrate 12 may be aligned with the outer edges of the sealing material to thereby minimize the width of the border of the display device and maximize screen occupation ratio so as to improve the display effect.

In order to decrease the width of an border of a display device including the display device above to thereby narrow the border of the liquid crystal display including the display device above, the flexible thin film in the second area 111b is bent to be fitted onto the side of the display device.

In order to facilitate bending of the flexible thin film in the second area 111b and the display effect of the display device, the flexible thin film in the second area 111b is bent toward the side of the display device in the direction, in which the first display substrate 11, i.e., the array substrate, lies, i.e., toward the side of the array substrate.

Figure 3:
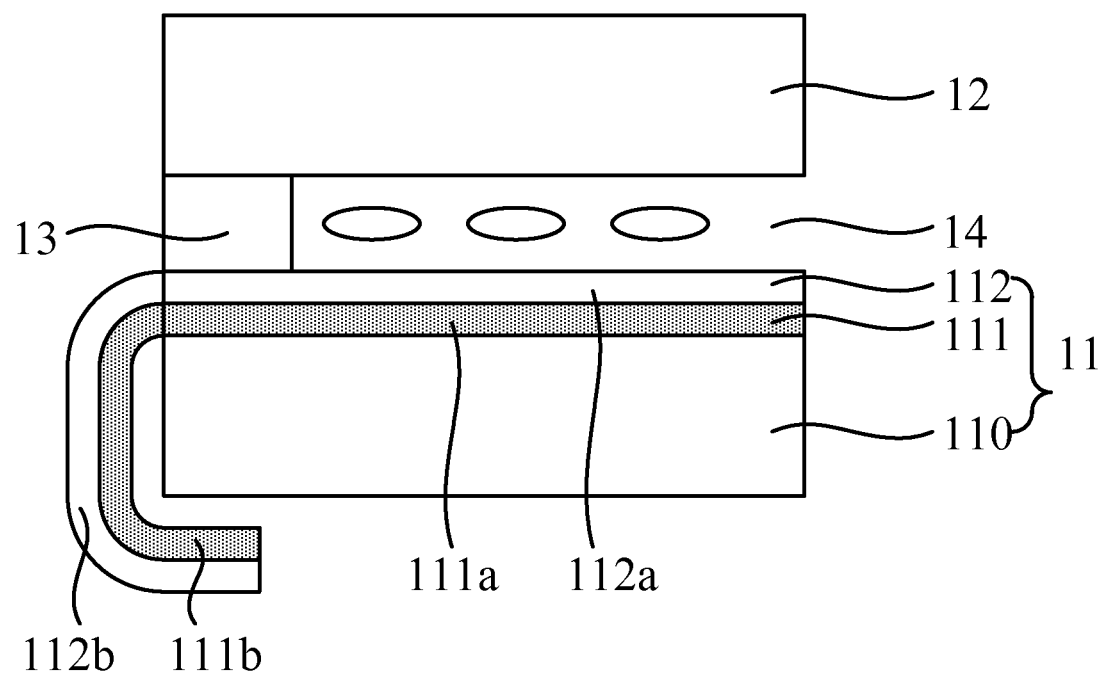
FIG. 3 illustrates a schematic structural diagram of another display device according to an embodiment of the disclosure in a sectional view.

In a particular implementation, if the length of the flexible thin film 111 in the second area 111b goes beyond the thickness of the substrate 110 in the first display substrate 11, then the part thereof beyond the thickness may be bent to be fitted onto the surface of the first display substrate 11 away from the opposite substrate 12. Further to the liquid crystal display device according to the embodiment above, the disclosure further provides an embodiment of another liquid crystal display device as follows:

FIG. 3 illustrates a schematic structural diagram of another liquid crystal display device according to an embodiment of the disclosure in a sectional view.

As illustrated in FIG. 3, the liquid crystal display device may include a first display substrate 11, and an opposite substrate 12, between which a sealing material 13 is disposed with a sealed area being a display area. Particularly in this embodiment, the first display substrate 11 is an array substrate, the opposite substrate 12 is a color filter substrate, the first display substrate 11 is disposed opposite to the opposite substrate 12, and a liquid crystal layer 14 is filled in the area sealed by the sealing material 13, where the first display substrate 11, i.e., the array substrate, includes a substrate 110, and a flexible thin film 111 including a first area 111a covering the display area entirely, and a second area 111b, beyond the substrate 110, bent to be fitted onto the surface of the first display substrate 11, i.e., the array substrate, away from the opposite substrate 12, i.e., the color filter substrate; and a first circuit 112a is disposed on the first area 111a, and a second circuit 112b is disposed on the second area 111b; and where the first circuit 112a disposed on the first area 111a is a pixel circuit, and the second circuit 112b disposed on the second area 111b is a peripheral circuit. Particularly the pixel circuit disposed in the first area 111a is an array of pixels.

It shall be noted that in order to avoid an influence of the peripheral circuit 112b disposed in the second area 111b upon the display area surrounded by the sealing material, the width of the second area 111b bent to be fitted onto the surface of the first display substrate 11 away from the opposite substrate 12 shall not be larger than the width of the sealing material 13 in this embodiment.

In order to facilitate detection of a circuit failure in the second area, the bent flexible thin film in the second area may further be fixed and protected, for example, the bent flexible thin film in the second area may be fixed by a transparent adhesive tape, a polyimide (PI) adhesive, etc. After the bent flexible thin film in the second area is fixed, the bent flexible thin film in the second area may further be protected by an Optic Clear (OC) adhesive, an ultraviolet cured adhesive, a thermally cured adhesive, etc. Particularly when the protected second circuit in the second area fails, if the bent flexible thin film in the second area is protected by an OC adhesive, then the failing circuit may be identified directly to thereby defect the failure.

Preferably in order to improve the transmissivity of the display pane and facilitate fabrication of the pixel circuit and the peripheral circuit on the first display substrate 11, the transmissivity of the flexible thin film 111 is higher than 90%, and the highest endurable temperature thereof is not lower than 200° C.

The liquid crystal display device according to the embodiment above includes a first display substrate, and an opposite substrate, disposed opposite to each other; the first display substrate includes a substrate, and a flexible thin film including a first area covering the display area entirely, and a second area beyond the substrate; and first circuit is disposed on the first area, a second circuit is disposed on the second area, and the first display substrate is covered with a flexible thin film, so that the second circuit on the flexible thin film can be bent, and further the border of the display device can be narrowed without being limited by the requisite size of the peripheral circuit, thus narrowing the border of the display device and enlarging the display device to thereby accommodate the consumer demand for a wider screen on the liquid crystal display device. In the meanwhile, the peripheral circuit can further be made larger to thereby improve the charging effect and improve the yield of the product. Moreover the bent flexible thin film in the second area can further be fixed and protected to thereby facilitate detection of a failure of the circuit in the second area.

Figure 4:
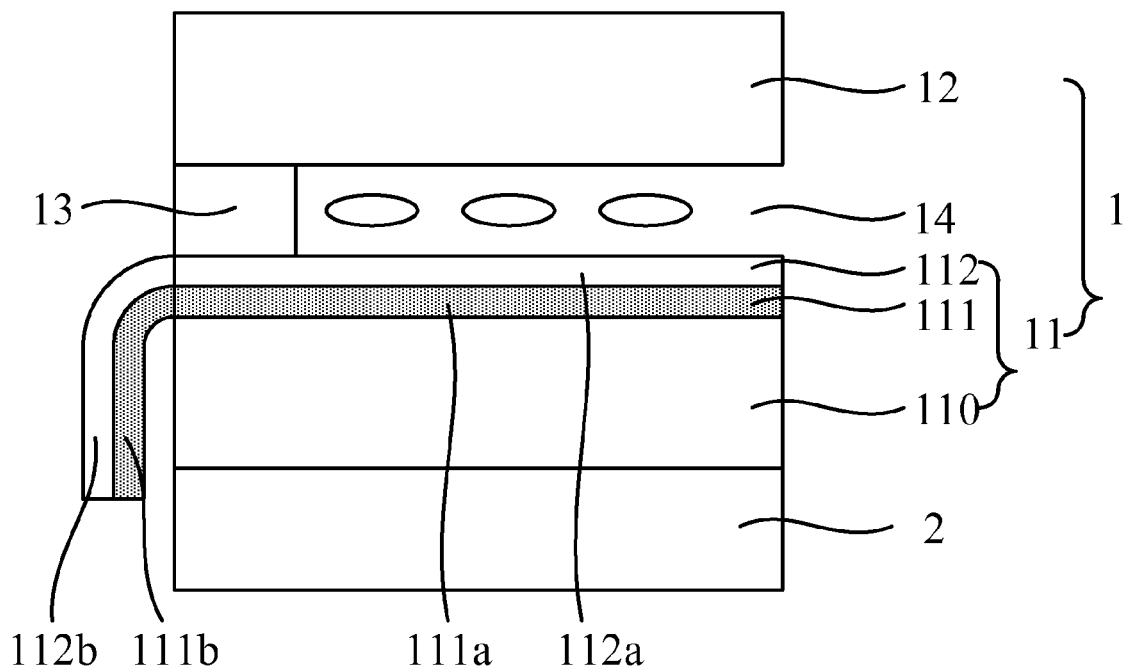
FIG. 4 illustrates a schematic structural diagram of a display device according to an embodiment of the disclosure in a sectional view.

An embodiment of the disclosure further provides a display device. FIG. 4 illustrates a schematic structural diagram of a display device according to an embodiment of the disclosure in a sectional view. As illustrated in FIG. 4, the display device may include a display panel (device) 1 according to the embodiment above, and a backlight module 2.

Particularly the display panel 1 includes a first display substrate 11, and an opposite substrate 12, disposed opposite to each other, and the backlight module 2 is disposed on the first display substrate surface of the display panel. It shall be noted that this embodiment will be described taking a liquid crystal display as an example, that is, the display panel 1 is a liquid crystal display panel, the first display substrate 11 is an array substrate, the opposite substrate 12 is a color filter substrate, and a liquid crystal layer is interposed between the array substrate and the color filter substrate.

Particularly the surface of the first display substrate 11 facing the opposite substrate 12 is a front surface, and the surface thereof away from the opposite substrate 12 is a back surface. The backlight module 2 is typically disposed on the back surface of the first display substrate 11, i.e., the surface of the array substrate away from the color filter substrate.

In order to narrow the border of the liquid crystal display to thereby increase the area of the display area so as to accommodate the consumer demand for a wider screen on the liquid crystal display panel, the first display substrate 11 includes a substrate 110, and a flexible thin film 111 including a first area 111a covering the display area entirely, a second area 111b beyond the substrate 110. The flexible thin film in the second area 111b is bent to be fitted onto the sides of the first display substrate 11 and the backlight module 2; and a first circuit 112a is disposed on the first area 111a, and a second circuit 112b is disposed on the second area 111b, where the first circuit 112a disposed on the first area 111a is a pixel circuit, and the second circuit 112b disposed on the second area 111b is a peripheral circuit.

Particularly the pixel circuit disposed on the first area 111a is an array of pixels. The peripheral circuit disposed on the second area 111b may be an Amorphous Silicon Gate Driver (ASG) circuit or a poly-silicon gate driving circuit or may be an electrode wire circuit or an integrated control circuit.

In the display panel according to this embodiment, three edges of the substrate 110 of the first display substrate 11 are aligned with outer edges of the sealing material 13. This structure is adopted due to a step in the substrate 110 of the first display substrate 11, where connection terminals connecting an external circuit with a display panel circuit are disposed on the step only on the edge where the step is located, so that the other edges can be aligned with the outer edges of the sealing material 13 to thereby narrow the border of the display panel and improve the screen occupation ratio. It shall be noted that in order to cut the array substrate flexibly at a lower labor cost, the edges of the first display substrate 11 may or may not be aligned with the outer edges of the sealing material 13. In some other embodiments of the disclosure, the substrate of the first display substrate may include four edges around the substrate, at least one of which is aligned with the outer edge of the sealing material, and this structure can be adopted to thereby save process steps in the manufacturing process so as to improve the manufacturing efficiency and lower the cost.

Moreover in this embodiment, edges of the opposite substrate 12 are aligned with the outer edges of the sealing material. In this embodiment, the opposite substrate 12 is a color filter substrate on which typically no driving circuits or pixel circuits or other circuits are disposed, and the edges of the opposite substrate 12 may be aligned with the outer edges of the sealing material to thereby minimize the width of the border of the display panel and maximize screen occupation ratio so as to improve the display effect.

In a particular implementation, if the length of the flexible thin film 111 in the second area 111b goes beyond the thickness of the substrate 110 in the first display substrate 11, and the backlight module 2, then the part thereof beyond the thickness may be bent to be fitted onto the surface of the backlight module 2 away from the first display substrate 11.

Figure 5:
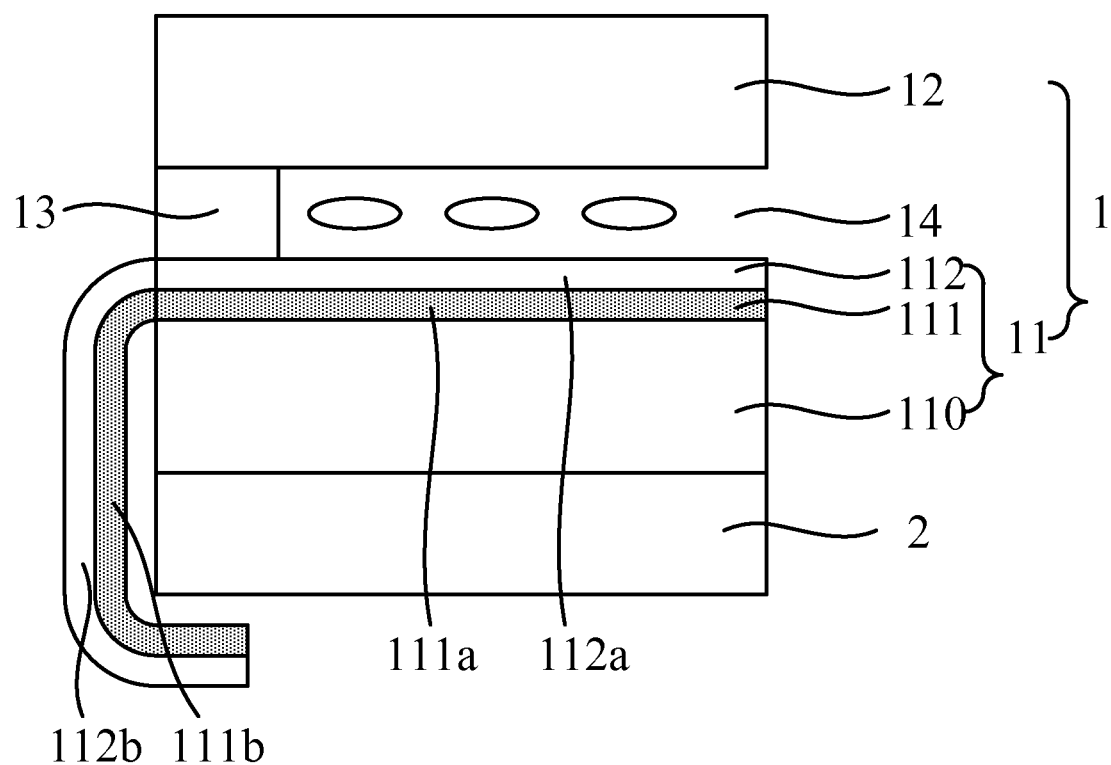
FIG. 5 illustrates a schematic structural diagram of another display device according to an embodiment of the disclosure in a sectional view.

An embodiment of the disclosure further provides a display device. FIG. 5 illustrates a schematic structural diagram of another display device according to an embodiment of the disclosure in a sectional view. As illustrated in FIG. 5, the display device may include a display panel (device) 1 and a backlight module 2.

Particularly the display panel 1 includes a first display substrate 11 and an opposite substrate 12 and the backlight module 2 is disposed on the first display substrate 11 side of the display panel 1, where the display panel 1 is a liquid crystal display panel, the first display substrate 11 is an array substrate, the opposite substrate 12 is a color filter substrate, and a sealing material 13 is interposed between the array substrate and the color filter substrate with a sealed area being a display area in which a liquid crystal layer 14 is filled.

Particularly the surface of the first display substrate 11, i.e., the array substrate, facing the opposite substrate 12, i.e., the color filter substrate, is a front surface, and the surface thereof away from the color filter substrate is a back surface.

The backlight module 2 is typically disposed on the back surface of the first display substrate 11.

In order to narrow the border of the display to thereby increase the area of the display area so as to accommodate the consumer demand for a larger ratio in area of the liquid crystal display area, the first display substrate 11 includes a substrate 110, and a flexible thin film 111 including a first area 111a covering the display area entirely, and a second area 111b beyond the substrate 110. The flexible thin film 111 in the second area 111b is bent to be fitted onto the sides of the first display substrate 11 and the backlight module 2; and a first circuit 112a is disposed on the first area 111a, and a second circuit 112b is disposed on the second area 111b, where the first circuit 112a disposed on the first area 111a is a pixel circuit, and the second circuit 112b disposed on the second area 111b is a peripheral circuit.

Particularly the pixel circuit disposed on the first area 111a is an array of pixels. The peripheral circuit disposed on the second area 111b may be an Amorphous Silicon Gate Driver (ASG) circuit or a poly-silicon gate driving circuit or may be an electrode wire circuit or an integrated control circuit. In order to facilitate detection of a failure of the second circuit on the second area, the bent flexible thin film in the second area may further be fixed and protected, for example, the bent flexible thin film in the second area may be fixed by a transparent adhesive tape, a polyimide (PI) adhesive, etc. After the bent flexible thin film in the second area is fixed, the bent flexible thin film in the second area may further be protected by an Optic Clear (OC) adhesive, an ultraviolet cured adhesive, a thermally cured adhesive, etc. Particularly when the protected second circuit on the second area fails, if the bent flexible thin film in the second area is protected by an OC adhesive, then the failing circuit can be identified directly to thereby defect the failure.

Preferably in order to improve transmissivity of the display panel and facilitate fabrication of the pixel circuit and the peripheral circuit on the first display substrate 11, the transmissivity of the flexible thin film 111 is higher than 90%, and the highest endurable temperature thereof is not lower than 200° C.

The display device according to the embodiment above includes the display panel according to the embodiment above, and a backlight module, and the display panel includes an array substrate, and a color filter substrate, disposed opposite to each other, and the backlight module is disposed on the array substrate side of the liquid crystal display panel, so that the flexible thin film in the second area can be bent to be fitted onto the sides of the array substrate and the backlight module, and further the border of the liquid crystal display panel can be narrowed without being limited by the requisite size of the peripheral circuit, thus narrowing the border of the liquid crystal display panel and enlarging the liquid crystal display panel to thereby accommodate the consumer demand for a wider screen on the liquid crystal display panel. Moreover the bent flexible thin film in the second area can further be fixed and protected to thereby facilitate detection of a failure of the circuit on the second area.

Based upon the same technical idea, an embodiment of the disclosure provides a method for manufacturing a display device, which can be applicable to manufacturing of the display device according to the embodiment above.

Figure 6:
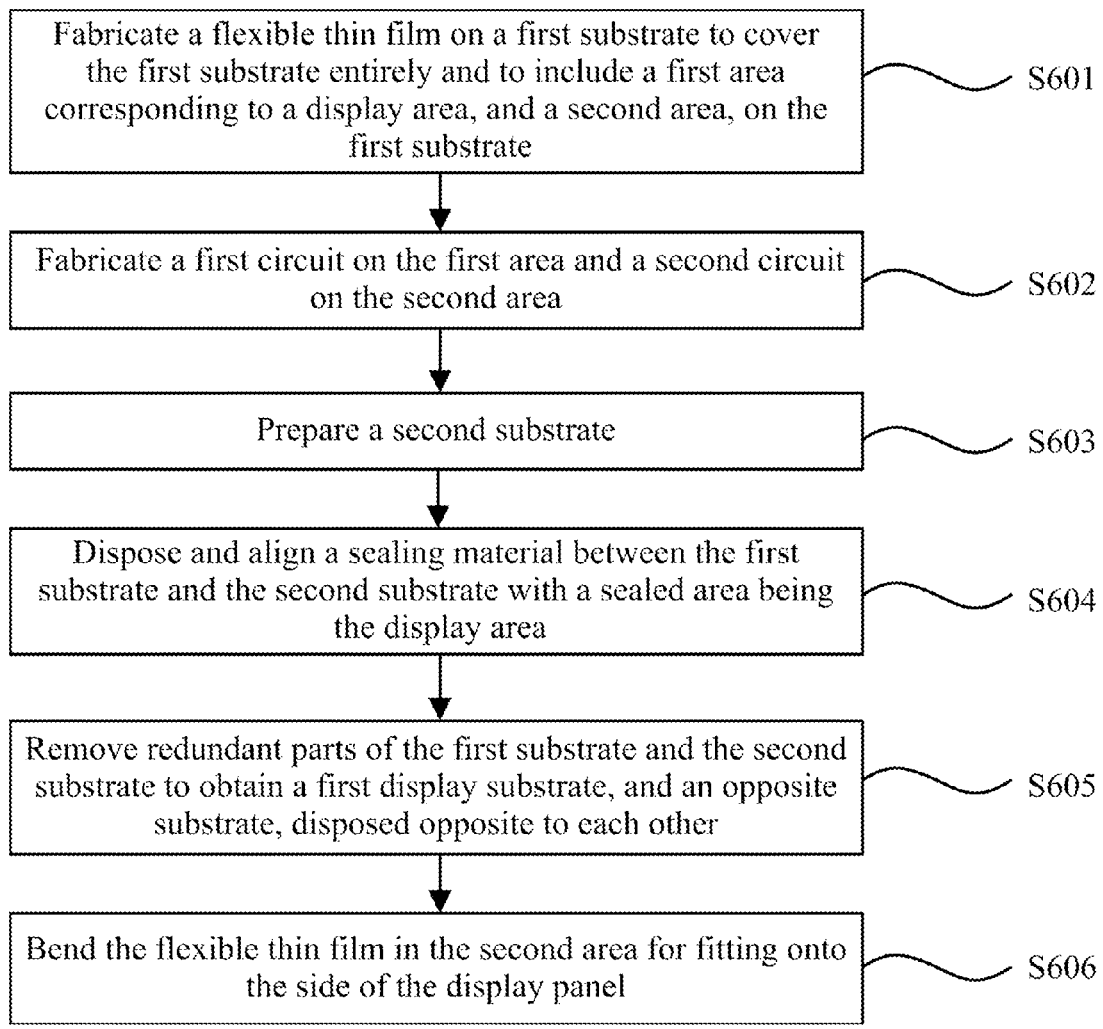
FIG. 6 illustrates a flow chart of a method of manufacturing a display device according to an embodiment of the disclosure.

FIG. 6 illustrates a flow chart of a method of manufacturing a liquid crystal display device according to an embodiment of the disclosure, and FIG. 7A to FIG. 7E illustrate schematic structural diagrams during the flow of manufacturing a liquid crystal display device according to an embodiment of the disclosure in sectional views. Referring to FIG. 6 and FIG. 7A to FIG. 7E, the method may include:

S601 is to preparing a first substrate and fabricate a flexible thin film on the first substrate to cover the first substrate entirely and to include a first area corresponding to a display area, and a second area, on the first substrate.

S602 is to fabricate a first circuit on the first area and a second circuit on the second area.

S603 is to prepare a second substrate.

S604 is to dispose and align a sealing material between the first substrate and the second substrate with a sealed area being the display area.

S605 is to remove excess parts of the first substrate and the second substrate to obtain a first display substrate, and an opposite substrate, disposed opposite to each other, where the first display substrate includes a substrate and the flexible thin film, the second area of the flexible thin film goes correspondingly beyond the area of the substrate, the excess part of the first substrate is the first substrate other than the substrate, and the excess part of the second substrate is the second substrate other than the opposite substrate.

S606 is to bend the flexible thin film in the second area for fitting onto the side of the display panel.

Particularly in order to improve the transmissivity of the display pane and facilitate fabrication of the pixel circuit and the peripheral circuit on the substrate, the transmissivity of the flexible thin film is higher than 90% and the highest endurable temperature thereof is not lower than 200° C. in the step 601.

Figure 7A:
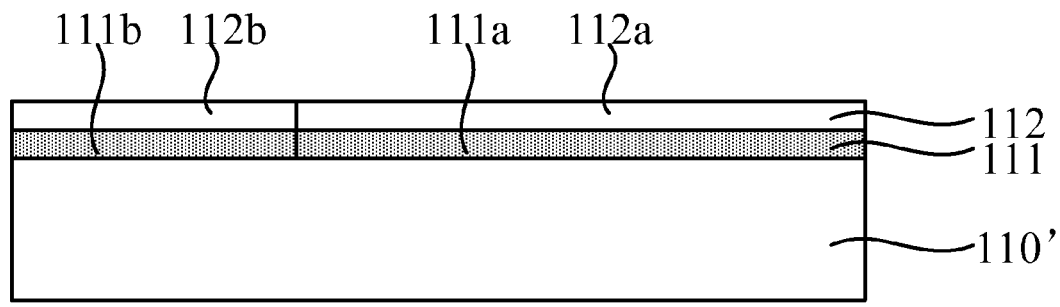
FIG. 7A to FIG. 7E illustrate schematic structural diagrams during the flow of manufacturing a display device according to an embodiment of the disclosure in sectional views.

Referring to FIG. 6 and FIG. 7A, the step S601 and the step S602 are performed, where the flexible thin film 111 is fabricated on the first substrate 110' to cover the first substrate entirely 110' and to include the first area 111a corresponding to the display area, and the second area 111b, on the first substrate 110', and the first circuit 112a is fabricated on the first area 111a, and the second circuit 112b is fabricated on the second area 111b, where the first circuit 112a and the second circuit 112b are fabricated at the same time, and the first circuit 112a and the second circuit 112b constitute a circuit 112. Referring to FIG. 7A, there is illustrated a schematic structural diagram of the substrate of the display device including the flexible thin film 111 fabricated on the first substrate 110', and the first circuit 112a fabricated on the first area 111a and the second circuit 112b fabricated on the second area 111b of the flexible thin film 111, according to the embodiment of the disclosure in a sectional view.

Figure 7B:
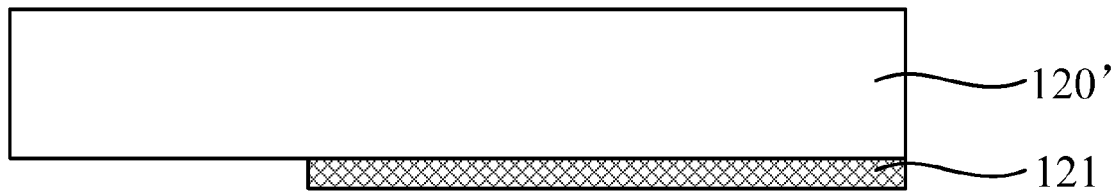

Referring to FIG. 6 and FIG. 7B, the step S603 is performed, where the second substrate 120' is prepared. More particularly in the method for fabricating a liquid crystal display device according to this embodiment, after the second substrate 120' is prepared, display elements 121 are further fabricated on the second substrate 120', where the display elements 121 correspond to the first area 111a of the flexible thin film 111 on the first substrate 110'. More particularly the display elements 121 on the second substrate 120' are color filter films, black matrixes or other display elements. It shall be noted that this embodiment is only exemplary, but in other embodiments of the disclosure, when the display device is prepared as another display device, e.g., an organic light-emitting display device, the display elements 121 may be organic light-emitting materials or other display elements. The disclosure will not be limited to the steps and structures described in this embodiment.

Figure 7C:
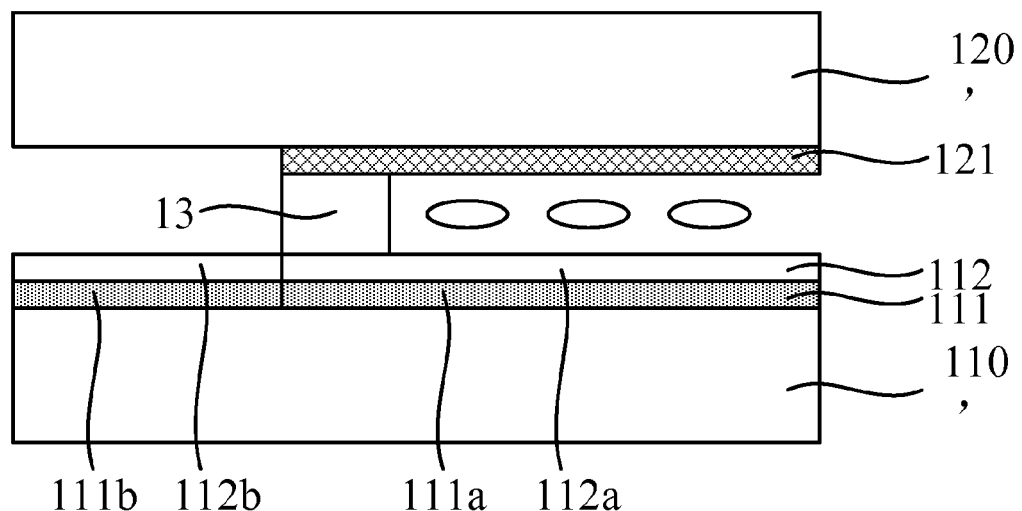

Referring to FIG. 6 and FIG. 7C, the step S604 is performed, where the sealing material 13 is disposed and aligned between the first substrate 110' and the second substrate 120' with the sealed area being the display area. More particularly the liquid crystal layer 14 is filled between the first substrate 110' and the second substrate 120'. Referring to FIG. 7B, there is illustrated a schematic structural diagram of the display device including the sealing material 13 disposed between the first substrate 110' and the second substrate 120', and the liquid crystal layer 14 filled in the display area in which the sealing material is packaged, according to the embodiment of the disclosure in a sectional view.

Figure 7D:
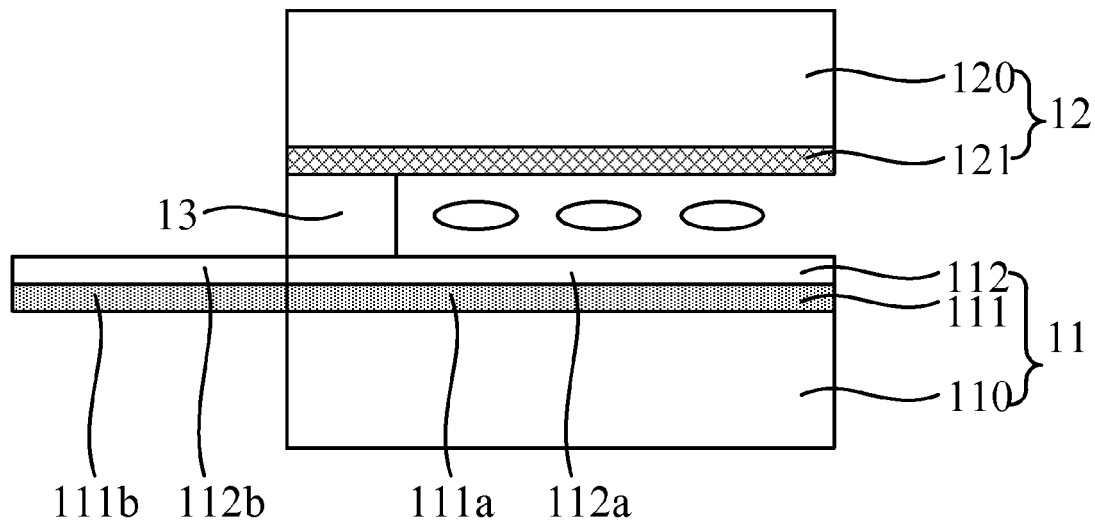

Referring to FIG. 6 and FIG. 7D, the step S605 is performed, where the excess parts of the first substrate and the second substrate are removed to obtain the first display substrate and the opposite substrate. Particularly in the method for fabricating a liquid crystal display device according to this embodiment, the first display substrate is an array substrate and the opposite substrate is a color filter substrate in this embodiment. Further to the structure of the display device illustrated in FIG. 7C, the excess parts of the first substrate 110' and the second substrate 120' are removed to form the first display substrate 11, i.e., the array substrate, and the opposite substrate 12, i.e., the color filter substrate, the first display substrate 11 includes the substrate 110, and the flexible thin film 111 covering the entire substrate 110, the second area 111b of the flexible thin film 111 goes correspondingly beyond the area of the substrate 110, the excess part of the first substrate 110' is the first substrate 110' other than the substrate 110, and the excess part of the second substrate 120' is the second substrate 120' other than the opposite substrate 12.

In order to decrease the width of an border of a display including the liquid crystal display device above to thereby narrow the border of the liquid crystal display including the liquid crystal display device above, after the excess parts of the first substrate 110' and the second substrate 120' are removed, the flexible thin film 111 in the second area 111b may further be bent to be fitted onto the side of the liquid crystal display device, i.e., the side of the array substrate. The flexible thin film 111 in the second area 111b may be bent toward the array substrate or the color filter substrate.

Figure 7E:
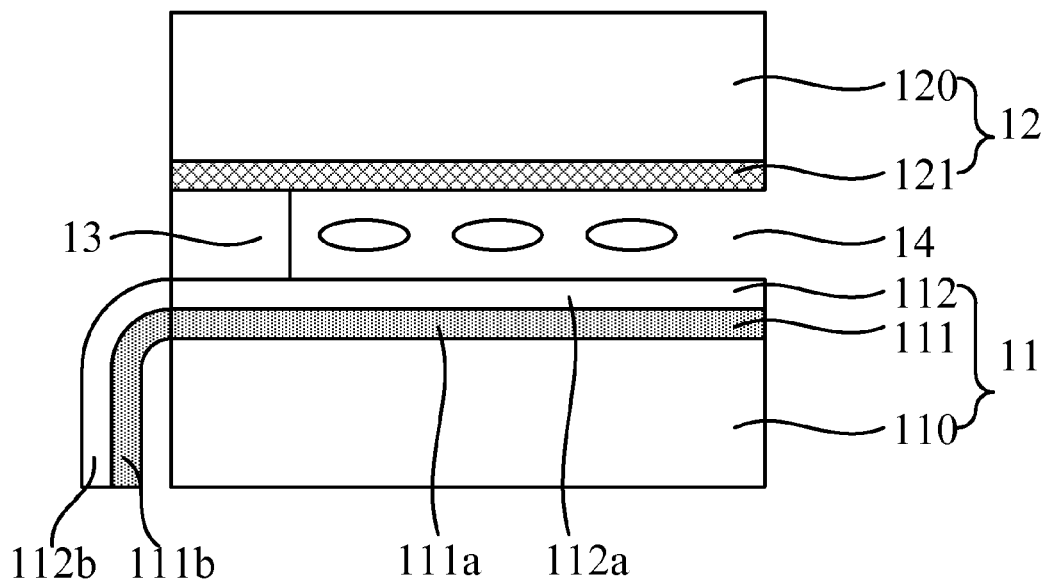

Thus referring to FIG. 6 and FIG. 7E, the step S606 is performed, where further to the structure illustrated in FIG. 7D, the flexible thin film 111 in the second area 111b may be bent to be fitted onto the side of the display device, i.e., the side of the first substrate 11, i.e., the side of the substrate 110.

More particularly in the step S602, when the first circuit 112a fabricated on the first area 111a, and the second circuit 112b is fabricated on the second area 111b, the first circuit 112a is an array of pixels, and the second circuit 112b is a peripheral circuit which may be an ASG circuit or a polysilicon gate driving circuit or may be an electrode wire circuit or an integrated control circuit. Furthermore in order to avoid a degraded characteristic of the flexible thin film, the first circuit and the second circuit shall be fabricated at temperature no higher than the highest endurable temperature of the flexible thin film.

More particularly in S605 of this embodiment, after the excess parts of the first substrate 110' and the second substrate 120' are removed, three edges of the substrate 110 of the first display substrate 11 are aligned with outer edges of the sealing material 13. This structure is adopted due to a step in the substrate 110 of the first display substrate 11, where connection terminals connecting an external circuit with a display device circuit are disposed on the step only on the edge where the step is located, so that the other edges can be aligned with the outer edges of the sealing material 13 to thereby narrow the border of the display device and improve the screen occupation ratio. It shall be noted that in order to cut the array substrate flexibly at a lower labor cost, the edges of the first display substrate 11 may or may not be aligned with the outer edges of the sealing material 13. In some other embodiments of the disclosure, the substrate of the first display substrate may include four edges around the substrate, at least one of which is aligned with the outer edge of the sealing material, and this structure can be adopted to thereby save process steps in the manufacturing process so as to improve the manufacturing efficiency and lower the cost.

Moreover in this embodiment, edges of the opposite substrate 12 are aligned with the outer edges of the sealing material. In this embodiment, the opposite substrate 12 is a color filter substrate on which typically no driving circuits or pixel circuits or other circuits are disposed. The edges of the opposite substrate 12 may be aligned with the outer edges of the sealing material to thereby minimize the width of the border of the display device and maximize screen occupation ratio so as to improve the display effect.

In order to facilitate detection of a failure, the bent flexible thin film in the second area may further be fixed and protected, for example, the bent flexible thin film in the second area may be fixed by a transparent adhesive tape, a polyimide (PI) adhesive, etc. After the bent flexible thin film in the second area is fixed, the bent flexible thin film in the second area may further be protected by an Optic Clear (OC) adhesive, an ultraviolet cured adhesive, a thermally cured adhesive, etc. Particularly when the protected second circuit on the second area fails, if the bent flexible thin film in the second area is protected by an OC adhesive, then the failing circuit can be identified directly to thereby defect the failure.

It shall be noted that after the step S606 of this embodiment, if the length of the flexible thin film 111 in the second area 111b goes beyond the thickness of the substrate 110 in the first display substrate 11, then the part thereof beyond the thickness may be bent to be fitted onto the surface of the first display substrate 11 away from the opposite substrate 12. It shall be noted that in order to avoid an influence of the peripheral circuit 112b disposed on the second area 111b upon the display area surrounded by the sealing material, the width of the second area 111b bent to be fitted onto the surface of the first display substrate 11 away from the opposite substrate 12 shall not be larger than the width of the sealing material 13 in this embodiment.

The method for fabricating a liquid crystal display device according to this embodiment includes: fabricating a flexible thin film on a first substrate to cover the first substrate entirely and to include a first area corresponding to a display area, and a second area, on the first substrate; fabricating a first circuit on the first area; fabricating a second circuit on the second area; and removing excess parts of the first substrate and the second substrate to obtain a first display substrate and an opposite substrate, where the first display substrate includes a substrate and the flexible thin film, and the second area of the flexible thin film goes correspondingly beyond the area of the substrate, so that the second circuit on the flexible thin film may be bent, and further the border of the liquid crystal display device can be narrowed without being limited by the requisite size of the peripheral circuit, thus narrowing the border of the display device and improve the ratio in area of the display device to thereby accommodate the consumer demand for a wider screen on the liquid crystal display device. Moreover the bent flexible thin film in the second area can further be fixed and protected to thereby facilitate detection of a failure of the circuit on the second area.

Based upon the liquid crystal display according to the embodiment above, an embodiment of the disclosure further provides a method for manufacturing a display device, which can be applicable to manufacturing of the liquid crystal display according to the embodiment above.

Figure 8:
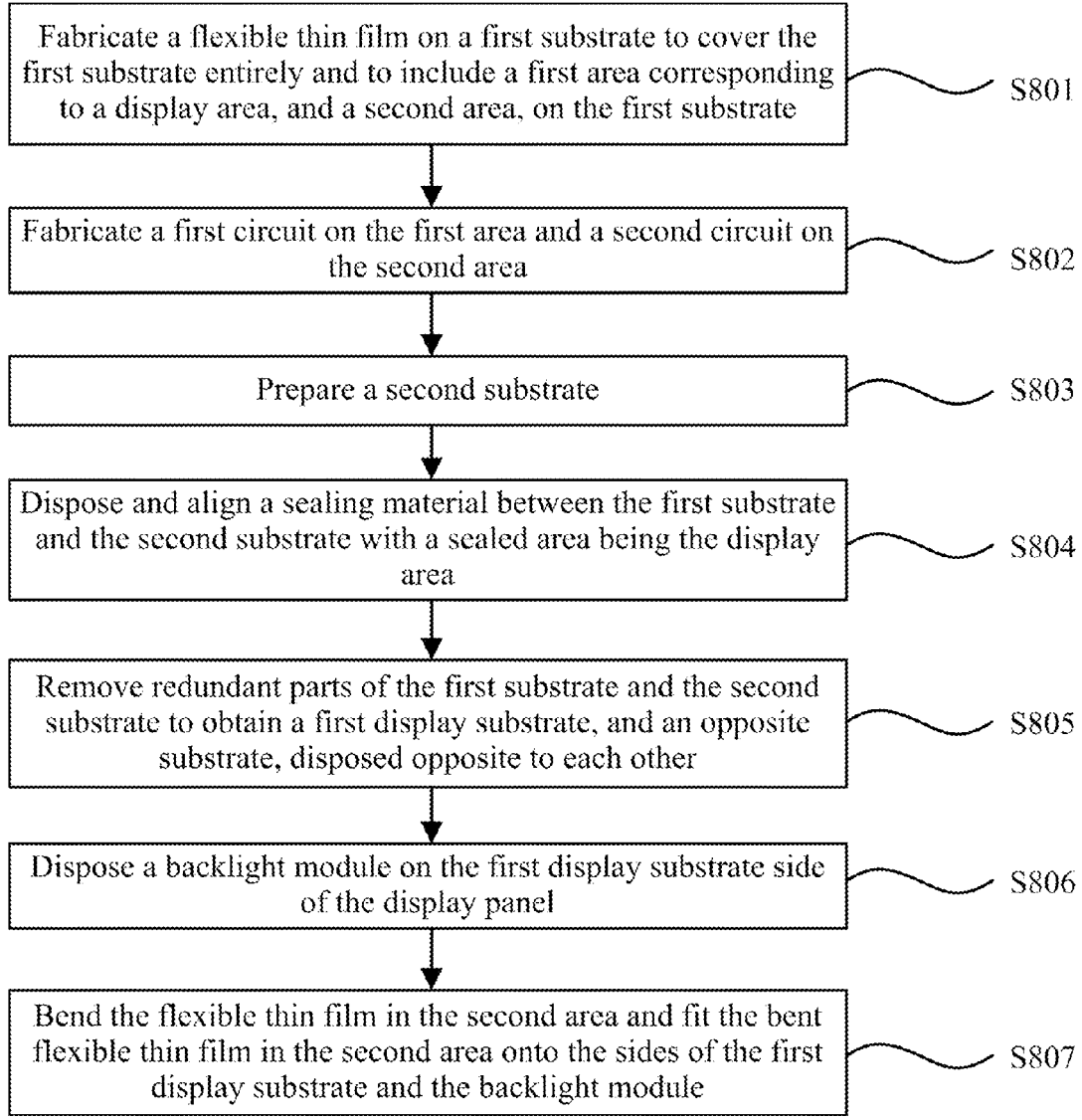
FIG. 8 illustrates a flow chart of a method for manufacturing a display device according to an embodiment of the disclosure.

FIG. 8 illustrates a flow chart of a method of manufacturing a display device according to an embodiment of the disclosure, and FIG. 9A to FIG. 9F illustrate schematic structural diagrams of a flow of manufacturing a display device according to an embodiment of the disclosure in sectional views. Referring to FIG. 8 and FIG. 9A to FIG. 9F, the method may include:

S801 is to preparing a first substrate and fabricate a flexible thin film on the first substrate to cover the first substrate entirely and to include a first area corresponding to a display area, and a second area, on the first substrate.

S802 is to fabricate a first circuit on the first area and a second circuit on the second area.

S803 is to prepare a second substrate.

S804 is to dispose and align a sealing material between the first substrate and the second substrate with a sealed area being the display area.

S805 is to remove excess parts of the first substrate and the second substrate to obtain a first display substrate, and an opposite substrate, disposed opposite to each other, where the first display substrate includes a substrate and the flexible thin film, the second area of the flexible thin film goes correspondingly beyond the area of the substrate, the excess part of the first substrate is the first substrate other than the substrate, and the excess part of the second substrate is the second substrate other than the opposite substrate.

S806 is to dispose a backlight module on the first display substrate side of the display device.

S807 is to bend the flexible thin film in the second area and to fit the bent flexible thin film in the second area onto the sides of the first display substrate and the backlight module.

Particularly in order to improve the transmissivity of the display pane and facilitate fabrication of the pixel circuit and the peripheral circuit on the substrate, preferably the transmissivity of the flexible thin film is preferably higher than 90% and the highest endurable temperature thereof is not lower than 200° C., that is, high temperature to which the flexible thin film 111 is endurable is preferably higher than or equal to 200° C., when the flexible thin film is fabricated on the first substrate in the step 801.

Figure 9A:
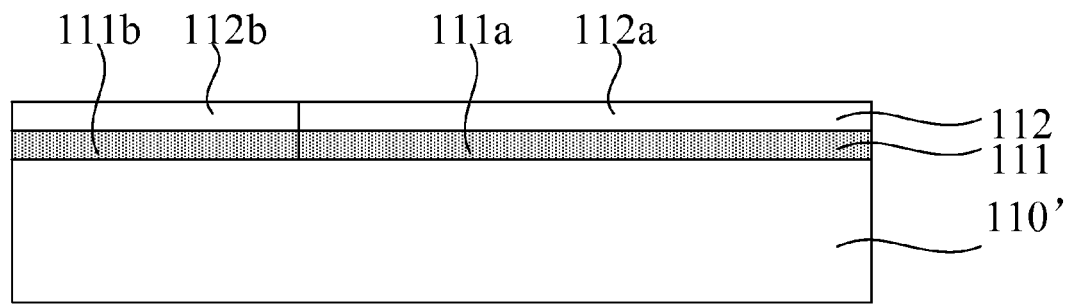
FIG. 9A to FIG. 9F illustrate schematic structural diagrams of a flow of manufacturing a display device according to an embodiment of the disclosure in sectional views.

Referring to FIG. 8 and FIG. 9A, the step S801 and the step S802 are performed, where the flexible thin film 111 is fabricated on the first substrate 110' to cover the first substrate entirely 110' and to include the first area 111a corresponding to the display area, and the second area 111b, on the first substrate 110', and the first circuit 112a is fabricated on the first area 111a, and the second circuit 112b is fabricated on the second area 111b, where the first circuit 112a and the second circuit 112b are fabricated at the same time, and the first circuit 112a and the second circuit 112b constitute a circuit 112. Referring to FIG. 9A, there is illustrated a schematic structural diagram of the substrate of the display device including the flexible thin film 111 fabricated on the first substrate 110', and the first circuit 112a fabricated on the first area 111a and the second circuit 112b fabricated on the second area 111b of the flexible thin film 111, according to the embodiment of the disclosure in a sectional view.

Figure 9B:
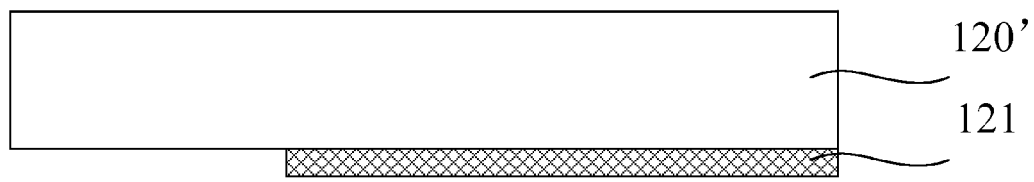

Referring to FIG. 8 and FIG. 9B, the step S803 is performed, where the second substrate 120' is prepared. More particularly in the method for fabricating a liquid crystal display device according to this embodiment, after the second substrate 120' is prepared, display elements 121 are further fabricated on the second substrate 120', where the display elements 121 correspond to the display area, that is, the display elements 121 correspond to the first area 111a of the flexible thin film 111 on the first substrate 110'. More particularly the display elements 121 on the second substrate 120' are color filter films, black matrixes or other display elements. It shall be noted that this embodiment is only exemplary, but in other embodiments of the disclosure, when the display device is prepared as another display device, e.g., an organic light-emitting display device, the display elements 121 may be organic light-emitting materials or other display elements. The disclosure will not be limited to the steps and structures described in this embodiment.

Figure 9C:
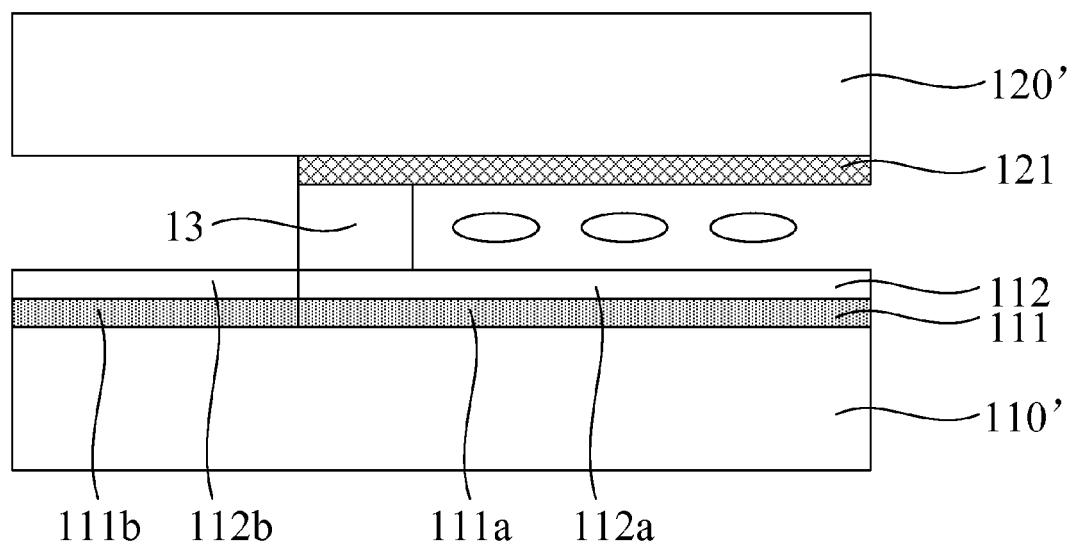

Referring to FIG. 8 and FIG. 9C, the step S804 is performed, where the sealing material 13 is disposed and aligned between the first substrate 110' and the second substrate 120' with the sealed area being the display area. More particularly the liquid crystal layer 14 is filled between the first substrate 110' and the second substrate 120'. Referring to FIG. 9B, there is illustrated a schematic structural diagram of the display device including the sealing material 13 disposed between the first substrate 110' and the second substrate 120', and the liquid crystal layer 14 filled in the display area in which the sealing material is packaged, according to the embodiment of the disclosure in a sectional view.

Figure 9D:
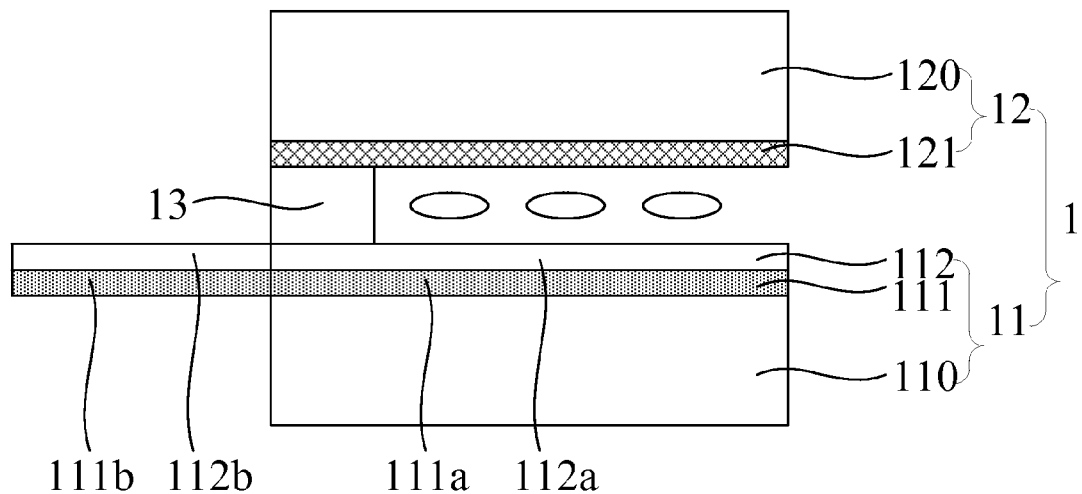

Referring to FIG. 8 and FIG. 9D, the step S805 is performed, where the excess parts of the first substrate 110' and the second substrate 120' are removed to obtain the first display substrate 11 and the opposite substrate 12. Particularly in the method for fabricating a liquid crystal display device according to this embodiment, the first display substrate is an array substrate and the opposite substrate is a color filter substrate in this embodiment. Further to the structure of the display device illustrated in FIG. 9C, the excess parts of the first substrate 110' and the second substrate 120' are removed to form the first display substrate 11, i.e., the array substrate, and the opposite substrate 12, i.e., the color filter substrate, the first display substrate 11 includes the substrate 110, and the flexible thin film 111 covering the entire substrate 110, the second area 111b of the flexible thin film 111 goes correspondingly beyond the area of the substrate 110, the excess part of the first substrate 110' is the first substrate 110' other than the substrate 110, and the excess part of the second substrate 120' is the second substrate 120' other than the opposite substrate 12.

Figure 9E:
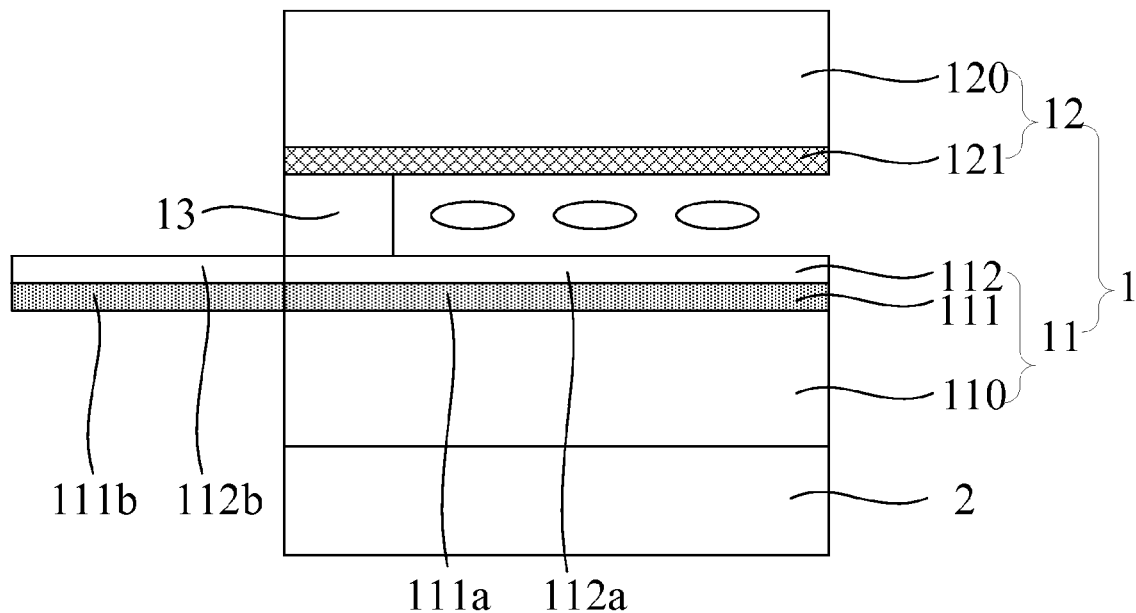

Referring to FIG. 8 and FIG. 9E, the step S806 is performed, where further to the structure of the display panel 1 illustrated in FIG. 9D, the backlight module 2 is disposed on the substrate 110 side of the first display substrate 11.

Figure 9F:
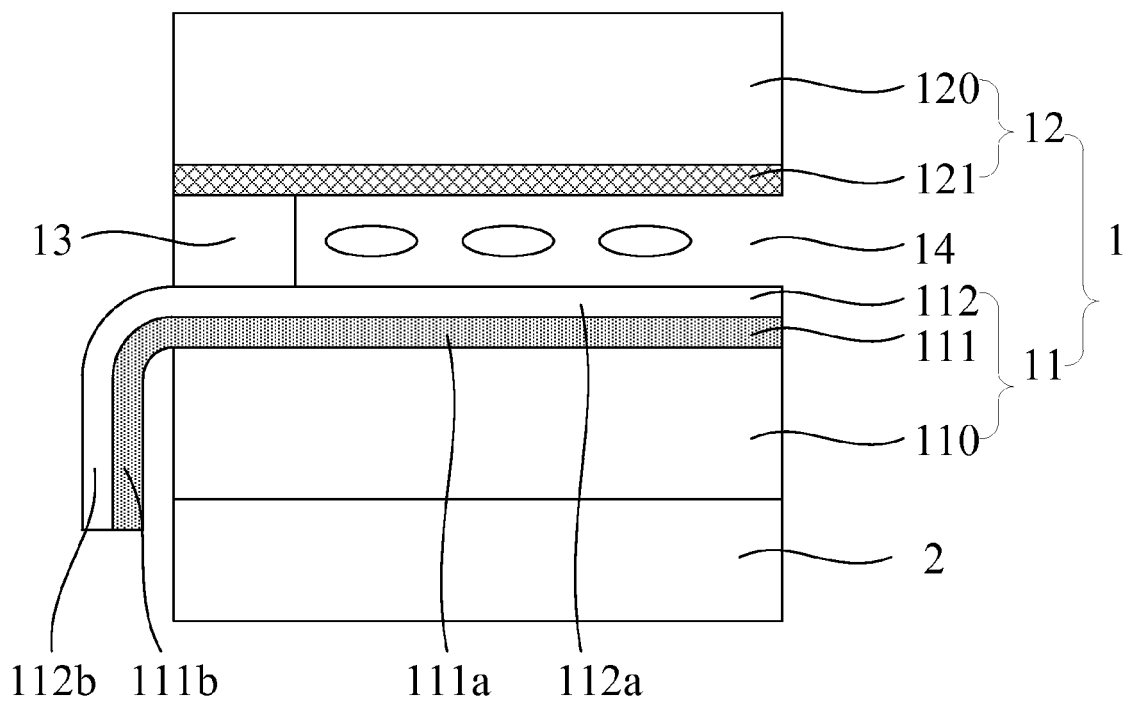

Further referring to FIG. 8 and FIG. 9F, the step S807 is preformed, after the backlight module 2 is disposed on the substrate 110 side of the first display substrate 11, the flexible thin film 111 in the second area 111b is bent, and the bent flexible thin film 111 in the second area 111b, the substrate 110 is fitted onto the sides of the first display substrate 11 and the backlight module 2.

Particularly the surface of the first display substrate 11 facing the opposite substrate 12 is a front surface, and the surface thereof away from the opposite substrate is a back surface. The backlight module 2 is disposed on the back surface of the first display substrate 11.

In the step S807, in order to decrease the width of an border of the liquid crystal display including the liquid crystal display panel 1 above, if the length of the flexible thin film 111 in the second area 111b goes beyond the thickness of the substrate 110 in the first display substrate 11 and the backlight module 2, then the part thereof beyond the thickness may be bent to be fitted onto the surface of the backlight module 2 away from the first display substrate 11.

After the step S807, in order to facilitate detection of a failure of the second circuit on the second area, the bent flexible thin film 111 in the second area 111b may further be fixed and protected, for example, the bent flexible thin film in the second area may be fixed by a transparent adhesive tape, a polyimide (PI) adhesive, etc. After the bent flexible thin film in the second area is fixed, the bent flexible thin film in the second area may further be protected by an Optic Clear (OC) adhesive, an ultraviolet cured adhesive, a thermally cured adhesive, etc. Particularly when the protected second circuit on the second area fails, if the bent flexible thin film in the second area is protected by an OC adhesive, then the failing circuit can be identified directly to thereby defect the failure.

The method for fabricating a display device according to the embodiment above includes the method for fabricating a display device according to the embodiment above, where the display device includes the first display substrate, and the opposite substrate, disposed opposite to each other, and the first display substrate includes the substrate, and the flexible thin film including the second area beyond the substrate; and the backlight module is disposed on the array substrate side of the display device, so that the flexible thin film in the second area can be bent, and the bent flexible thin film in the second area can be fitted onto the sides of the first display substrate and the backlight module, such that the flexible thin film in the second area can be fitted onto the sides of the array substrate and the backlight module, and further the border of the liquid crystal display device can be narrowed without being limited by the requisite size of the peripheral circuit, thus narrowing the border of the liquid crystal display device and enlarging the liquid crystal display device to thereby accommodate the consumer demand for a wider screen on the liquid crystal display device. Moreover the bent flexible thin film in the second area can further be fixed and protected to thereby facilitate detection of a failure of the circuit on the second area.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:
1. A display device, comprising:
a first display substrate;
an opposite substrate;
a sealing material forming a sealed area comprising a display area, wherein the sealing material is disposed between the first display substrate and the opposite substrate,
wherein the first display substrate comprises a substrate and a flexible thin film, wherein the flexible thin film comprises:
a first area entirely covering the display area, and
a second area beyond the substrate;
a first circuit disposed on the first area; and
a second circuit disposed on the second area.
2. The display device according to claim 1, wherein:
the first display substrate comprises an array substrate,
the opposite substrate is a color filter substrate, and
liquid crystals are between the array substrate and the color filter substrate in the display area.
3. The display device according to claim 1, wherein:
the substrate of the first display substrate comprises four edges around the substrate, wherein at least one the four edges is aligned with an outer edge of the sealing material.
4. The display device according to claim 3, wherein three edges of the substrate of the first display substrate are aligned with outer edges of the sealing material.
5. The display device according to claim 1, wherein edges of the opposite substrate are aligned with outer edges of the sealing material.
6. The display device according to claim 1, wherein the flexible thin film in the second area is bent to be fitted onto a side of the display panel.
7. The display device according to claim 6, wherein the flexible thin film in the second area is bent to the side of the display panel toward the substrate.
8. The display device according to claim 1, wherein transmissivity of the flexible thin film is greater than 90%, and a highest endurable temperature of the flexible thin film is not less than 200° C.
9. The display device according to claim 1, wherein the first circuit comprises a pixel circuit, and the second circuit comprises a peripheral circuit.
10. The display device according to claim 9, wherein the peripheral circuit comprises at least one of a gate driving circuit, an electrode wire circuit, and an integrated control circuit.
11. The display device according to claim 1, further comprising a backlight module, wherein the backlight module is disposed on a surface of the first display substrate facing away from the opposite substrate.
12. The display device according to claim 11, wherein the flexible thin film in the second area is bent to be fitted onto sides of the first display substrate and the backlight module.
13. The display device according to claim 12, wherein the flexible thin film in the second area extends beyond a thickness of the first display substrate and the backlight module, and wherein the flexible thin film is bent to be fitted onto a surface of the backlight module away from the first display substrate.
14. A method for manufacturing a display device, the method comprising:
preparing a first substrate;
fabricating a flexible thin film on the first substrate to entirely cover the first substrate, wherein the flexible thin film comprises:
a first area corresponding to a display area, and
a second area, on the first substrate;
fabricating a first circuit on the first area and a second circuit on the second area;

preparing a second substrate;

disposing and aligning a sealing material between the first substrate and the second substrate, wherein the display area is sealed by the sealing material; and removing excess parts of the first substrate and the second substrate to obtain a first display substrate and an opposite substrate, wherein the first display substrate comprises a substrate and the flexible thin film, the second area of the flexible thin film extends beyond an area of the substrate, the excess part of the first substrate is the first substrate extending beyond the sealing material, and the excess part of the second substrate is the second substrate extending beyond the sealing material.

15. The method according to claim 14, wherein the excess part of the first substrate is removed along at least one outer edge of the sealing material so that at least one edge of the substrate of the first display substrate is aligned with the outer edge of the sealing material.

16. The method according to claim 15, wherein the excess part of the first substrate is removed along three outer edges of the sealing material so that three edges of the substrate of the first display substrate are aligned with outer edges of the sealing material.

17. The method according to claim 15, wherein the excess part of the second substrate is removed along outer edges of the sealing material so that edges of the opposite substrate are aligned with the outer edges of the sealing material.

18. The method according to claim 14, wherein after the excess parts of the first substrate and the second substrate are removed, the method further comprises:

bending the flexible thin film in the second area for fitting onto a side of the display panel.

19. The method according to claim 14, wherein:

the first circuit comprises a pixel circuit, and the second circuit comprises a peripheral circuit, and the first circuit and the second circuit are fabricated at temperature no higher than a highest endurable temperature of the flexible thin film.

20. The method according to claim 14, wherein after the excess parts of the first substrate and the second substrate are removed, the method further comprises:

disposing a backlight module on the first display substrate side;

bending the flexible thin film in the second area; and fitting the bent flexible thin film in the second area onto sides of the display panel and the backlight module.

21. The method according to claim 20, wherein a length of the flexible thin film in the second area extends beyond a thickness of the substrate in the first display substrate and the backlight module, and wherein the method further comprises bending the flexible thin film extending beyond the thickness for fitting onto a surface of the backlight module away from the first display substrate.

22. The method according to claim 21, further comprising fixing and protecting the bent flexible thin film in the second area.

* * * * *